United States Patent [19]
Sheller

[11] Patent Number: 5,657,923
[45] Date of Patent: Aug. 19, 1997

[54] BRAZING OF CATALYZED CONVERTER BODIES

[75] Inventor: David Thomas Sheller, Garrettsville, Ohio

[73] Assignee: W. R. Grace & Co.-Conn., New York, N.Y.

[21] Appl. No.: 382,078

[22] Filed: Feb. 1, 1995

[51] Int. Cl.$^6$ .............................. B23K 1/002; F01N 3/28
[52] U.S. Cl. ..................... 228/181; 29/890; 422/180; 502/527; 228/233.2
[58] Field of Search .................... 228/181, 190, 228/203, 205; 29/890; 422/177, 180; 502/439, 527

[56] References Cited

U.S. PATENT DOCUMENTS

| | | | |
|---|---|---|---|
| 4,734,552 | 3/1988 | Brolin | 219/10.41 |
| 4,923,109 | 5/1990 | Cyron | 228/181 |
| 5,050,790 | 9/1991 | Takikawa et al. | 228/181 |
| 5,170,624 | 12/1992 | Cornelison et al. | 60/300 |
| 5,174,968 | 12/1992 | Whittenberger | 422/180 |
| 5,177,961 | 1/1993 | Whittenberger | 60/300 |

OTHER PUBLICATIONS

Brazing Handbook, 4th Edition, pp. 201–209, 241, "Induction Brazing", Resistance Brazing, copywrite 1991.
Brazing Handbook American Welding Society 1991, 4th Edition, pp. 201–209, 241.

Primary Examiner—Samuel M. Heinrich
Attorney, Agent, or Firm—Beverly J. Artale

[57] ABSTRACT

There is provided a process for brazing a first coated part to a second metal part which includes the steps of cleaning or masking, the surfaces of at least the first metal part, interposing a brazing metal foil between the metal parts, and induction heating the assembly to fuse the brazing metal foil, whereby the parts are adhered together, and then cooling. A controlled heating profile is disclosed.

20 Claims, 2 Drawing Sheets

BRAZING OF CATALYZED CONVERTER BODIES

This invention relates to a process for brazing of metallic catalyzed converter bodies without damaging the catalyst. Metallic catalytic converters are well known and are commonly in the form of a metallic multicellular honeycomb body made up of alternating flat and corrugated thin metal strips or layers and arranged to have a circular or oval cross-section. The honeycomb is contained in a housing of suitable shape, e.g., a tubular metal housing. The ends of the thin metal strips are secured to the inside of the tubular housing, or jacket, conveniently by means of a fused metal, e.g., a brazing or filler metal, applied in the form of a paste or foil, or by welding. In recent embodiments of this type of converter body, the thin metal strips are layered and the central portion crushed before or after layering to remove the corrugations, and the central portion welded or brazed to provide a rigid core member about which the thin metal strips are S-wound. The S-wound body is inserted in the tubular body and retained thereby.

Retention in the tubular body was most often achieved by brazing with a very thin brazing metal foil (0.001 to 0.003" thick) interposed between the inner surface of the tubular housing and the free ends of the coiled or S-wound stack of thin metal sheets. The resulting assembly was then heated in a hydrogen furnace to a temperature sufficient to fuse the brazing foil and secure the free ends of the thin metal strips to the inner surface of the tubular housing.

It has been found most convenient and economic to coat the surfaces of the thin metal strip material continuously in a process such as that described in U.S. Pat. No. 4,711,009 to Cornelison et al dated 8 Dec. 1987 prior to cutting the strips to the desired length. By this process, the strips are coated with a refractory metal oxide, e.g., alumina, alumina/ceria mixture, titania, titania/alumina mixture, titania/ceria mixture, silica, zirconia, or a zeolite; and with a catalyst, e.g., a noble metal catalyst selected from the group consisting of platinum, palladium, ruthenium, rhodium, indium and mixtures of two or more of such metals. Subjecting the core with the coating preapplied as in the Cornelison et al process, supra, to the relatively high brazing temperatures of about 2000 degrees F. was determined to be deleterious to the coating and to the catalyst. The high temperatures also caused the growth of large grains in some foils leading to fatigue failures.

It was then found that the core could be suitably brazed by placing the entire assembly within the coils of an induction heater whereby only the housing, the brazing foil and the free ends of the thin metal strips would be heated, and the main body of the honeycomb core would remain at temperatures not deleterious to the coating, the catalyst, or the foil.

Reference may be had to the patents to Nonnenmann U.S. Pat. No. 4,152,302 dated 1 May 1979, U.S. Pat. No. 4,273,681 dated 16 Jun. 1981, U.S. Pat. No. 4,282,186 dated 4 Aug. 1981, U.S. Pat. No. 4,381,590 dated 3 May 1983, U.S. Pat. No. 4,400,860 dated 30 Aug. 1983, U.S. Pat. No. 4,519,120 dated 28 May 1985, U.S. Pat. No. 4,521,947 dated 11 Jun. 1985, U.S. Pat. No. 4,647,435 dated 3 Mar. 1987, U.S. Pat. No. 4,665,051 dated 12 May 1987 and which disclose brazed corrugated and flat thin metal strips in the form of a honeycomb; U.S. Pat. No. 5,070,694 to Whittenberger dated 10 Dec. 1991; International PCT Publication Numbers WO 89/10470 (EP 412,086) and WO 89/10471 (EP 412,103) each filed 2 Nov. 1989, claiming a priority date of 25 Apr. 1988. The above international publication numbers disclose methods and apparatus for increasing the internal resistance of the device by placing spaced discs in series, or electrically insulating intermediate layers. Another International PCT Publication is WO 90/12951 published 9 Apr. 1990 and claiming priority date of 21 Apr. 1989, which seeks to improve axial strength by form locking layers of insulated plates. Reference may also be had to Kannnanian et al U.S. Pat. No. 5,055,275 which discloses improved axial strength. International PCT Publication Number 92/13636 filed 29 Jan. 1992 claiming a priority date of 31 Jan. 1991. This applicatiion relates to a honeycomb body along an axis of which fluid can flow through a plurality of channels. The honeycomb has at least two discs in spaced relation to each other. According to the specification, there is at least one bar type support near the axis by which the discs are connected together and mutually supported. The invention is said to make possible design of the first disc for fast heating up through exhaust gas passing through or applied, electrical current. The honeycomb body serves as a support for catalyst in the exhaust system of an internal combustion engine. Another reference is German Patent Application No. 4,102,890 A1 filed 31 Jan. 1991 and published 6 Aug. 1992. This application discloses a spirally wound corrugated and flat strip combination wherein the flat strips contain slots and perforations and is electrically heatable. The flat strips include a bridge between leading and trailing edge portions. Groups of such strips are separated by insulation means. The core is provided with a pair of circular retainer segments which are separated by insulation means. The core is provided with a pair of circular retainer segments which are separated by insulation means. Another reference is U.S. Pat. No. 5,102,743 dated 7 Apr. 1992 to Maus et al. This patent discloses a honeycomb catalyst carrier of round, oval or elliptical cross-section including a jacket tube, and a stack of at least partially structured sheet-metal layers intertwined in different directions in the jacket tube. The stack has a given length and a given width. At least one of the sheet metal layers has a greater thickness over at least part of one of the dimensions than others of the layers. Such at least one layer is formed of thicker metal or of a plurality of identically structured metal sheets in contiguous relation.

A common problem with prior devices has been their inability to survive severe automotive industry durability tests which are known as the Hot Shake Test and the Hot Cycling Test.

The Hot Shake Test involves oscillating (100 to 200 Hertz and 28 to 60 G inertial loading) the device in a vertical attitude at a high temperature between 800 and 950 degrees C. (1472 too 1742 degrees F., respectively) with exhaust gas from a running internal combustion engine simultaneously passing through the device. If the core of the catalytic device telescopes or displays separation or folding over of the leading or upstream edges of the foil leaves up to a predetermined time, e.g., 5 to 200 hours, the device is said to fail the test.

The Hot Cycling Test is performed with exhaust gas flowing at 800 to 950 degrees C.; (1472 to 1742 degrees F., respectively) and cycled to 120 to 150 degrees C. once every 15 to 20 minutes for 300 hours. Telescoping of the core, or separation of the leading edges of the thin metal foil strips is considered a failure.

The Hot Shake Test and the Hot Cycling Test are hereinafter called "Hot Tests" and have proved very difficult to survive. Many efforts to provide a successful device have proved either too costly or ineffective for a variety of reasons. The structures of the present invention will survive these Hot Tests.

In the following description, reference will be made to "ferritic" stainless steel. A suitable ferritic stainless steel for use particularly in the engine exhaust applications hereof, is described in U.S. Pat. No. 4,414,023 dated 8 Nov. 1983 to Aggen. A specific ferritic stainless steel alloy useful herein contains 20% chromium, 5% aluminum and from 0.002% to 0.05% of at least one rare earth metal selected from cerium, lanthanum, neodymium, yttrium, and praseodymium, or a mixture of two or more of such rare earth metals, balance iron and trace steel making impurities. A ferritic stainless steel of the foregoing analysis is commercially available from Allegheny Ludlum Steel Co. under the trademark "Alfa IV."

Another metal alloy especially useful herein is identified as Haynes 214 alloy which is also commercially available. This alloy and other nickeliferous alloys are described in U.S. Pat. No. 4,671,931 dated 9 Jun. 1987 to Herchenroeder et al. These alloys are characterized by high resistance to oxidation. A specific example of an alloy useful herein contains 75% nickel, 16% chromium, 4.5% aluminum, 3% iron, optionally trace amounts of one or more rare earth metals except yttrium, 0.05% carbon and steel making impurities. Haynes 230 alloy, also useful herein, has a composition containing 22% chromium, 14% tungsten, 2% molybdenum, 0.10% carbon, and a trace amount of lanthanum, balance nickel. The ferritic stainless steel, and the Haynes alloys 214 and 230 are examples of high temperature resistive, oxidation resistant (or corrosion resistant) metal alloys that are suitable for use in making thin metal strips for use in the converter bodies hereof, and, particularly for making integral heater strips for use in the EHC portions. Suitable metals must be able to withstand "high" temperatures, i.e., those in the range of from about 900 degrees C. to about 1200 degrees C. (1652 degrees F. to 2012 degrees F.) over prolonged periods.

Other high temperature resistive, oxidation resistant metal alloys are known and may be used herein. For most applications, and particularly automotive applications, these alloys are used as "thin" metal strips, that is, having a thickness of from about 0.001" to about 0.005", and preferably from 0.0015" to about 0.003".

In the following description, reference may also be made to fibrous ceramic mat, woven ceramic tape, or fabrics, or insulation. Reference may be had to U.S. Pat. No. 3,795,524 dated 5 Mar. 1974 to Sowman, and to U.S. Pat. 3,916,057 dated 28 Oct. 1975 to Hatch, for formulations and manufacture of fibers useful in making tapes and mats which may be used herein. One such woven ceramic fiber material is currently available from 3-M Co. under the trademark "NEXTEL" 312 Woven Tape and is useful for insulation of thin metal strips or groups thereof. Ceramic fiber mat is commercially available also from 3-M Co. under the trademark "INTERAM". For most purposes, a coating insulation layer of refractory metal oxide on the surface of the metal strips as applied, for example, by the process of Cornelison et al in U.S. Pat. No. 4,711,009, is preferred.

BRIEF STATEMENT OF THE INVENTION

Briefly stated, the present invention is a process for adhering an at least partially coated and catalyzed first metal body to a second metal body in a joint area, which comprises the steps of providing at least one first metal body having a coating of refractory metal oxide and a catalyst supported thereon; applying a fusible brazing metal to said joint area; retaining said first and said second metal bodies against relative movement to provide an assembly; placing said assembly within the coils of an induction heater; applying electrical power to said induction heater to raise the temperature in the joint area to a temperature sufficient to fuse said brazing metal; and cooling said assembly to effect adhesion of said first metal body to said second metal body.

BRIEF DESCRIPTION OF THE DRAWINGS

The invention may be better understood by having reference to the annexed drawings showing a preferred embodiment of the invention and wherein.

DETAILED DESCRIPTION OF THE DRAWINGS

As indicated above, the present invention is a process for brazing the free ends of thin metal strips to a surrounding housing or jacket tube. The principal feature of this invention is that the precoated coating and the precoated catalyst are not deleteriously affected by the brazing temperature which can be as high as 2150 degrees F. The brazing metal can be used as a paste, or as a thin foil, for example, 0.001 to 0.002" thick, and currently commercially available from Allied Signal as MBF 80 brazing foil which fuses at 2150 degrees F. The foil form of brazing metal is preferred.

Figure 5:
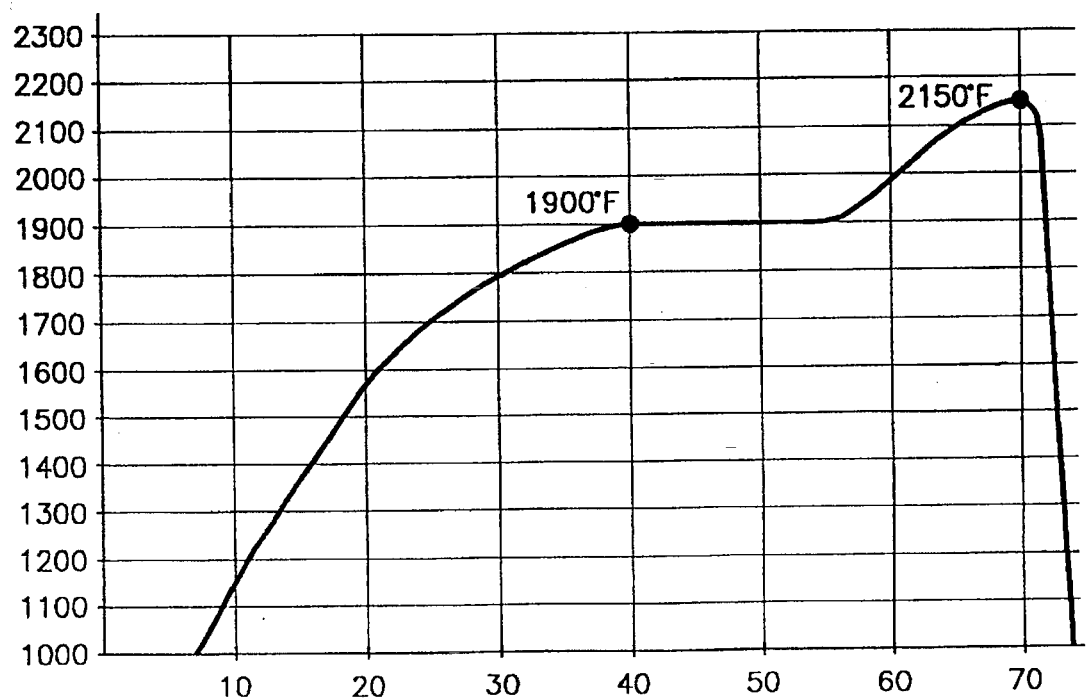
FIG. 5 is a temperature vs. time profile which is preferred for operating this process.

In the preferred practice of the process, the heating profile is of particular importance. A typical profile is shown in FIG. 5 and will be discussed below.

Figure 1:
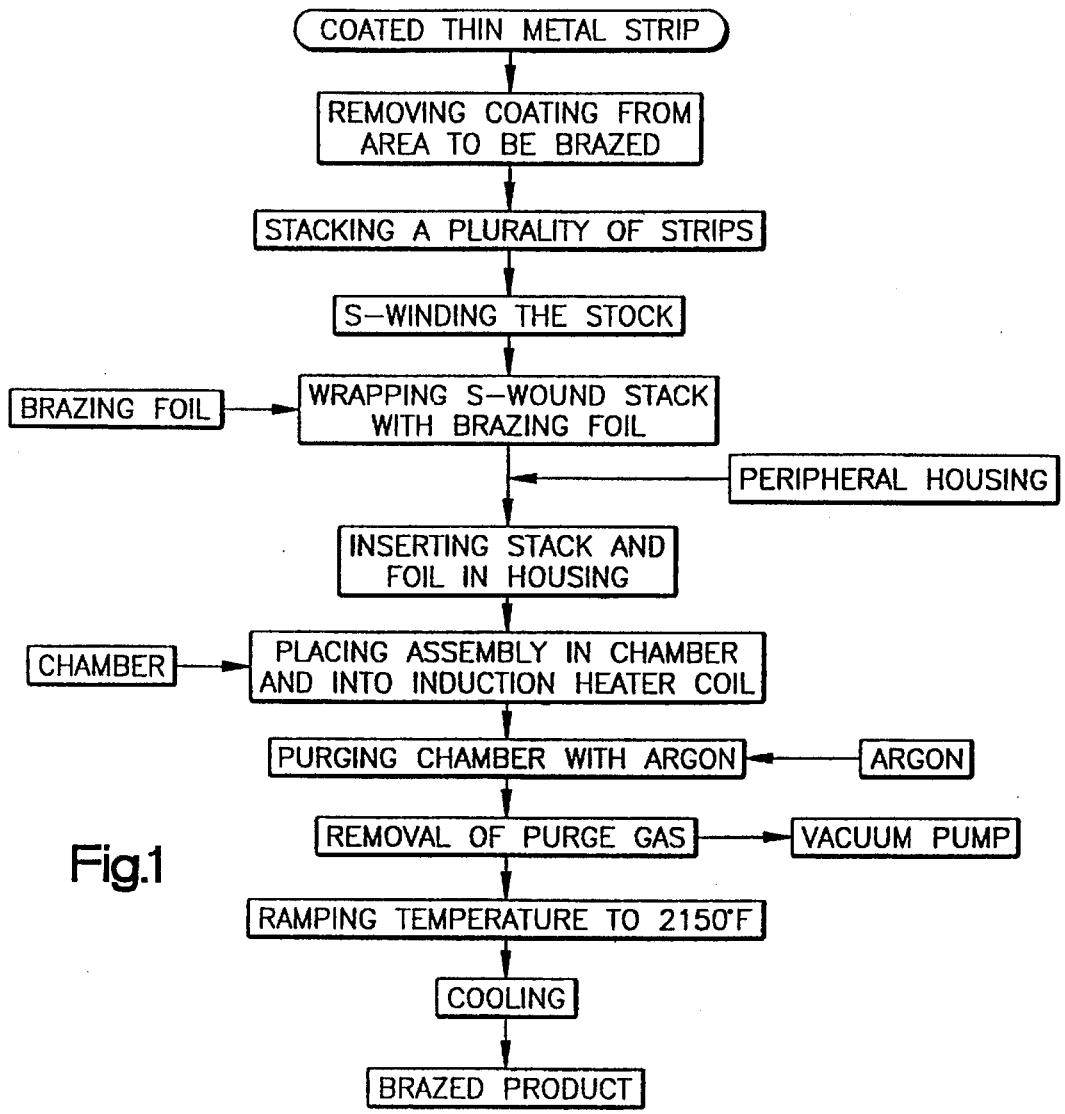
FIG. 1 is a flow sheet of the process hereof.

Referring now to FIG. 1, there is here illustrated a flow sheet of the process hereof. The thin metal strips supplied to the process are stainless steel such as those mentioned above, and they are coated as, for example, by the process described in U.S. Pat. No. 4,711,009 supra. The principal coating is a refractory metal oxide, such as those mentioned above, having superimposed thereon a catalyst, particularly a noble metal catalyst, such as mentioned above. The first principal step in the process is to remove the coating and catalyst in the areas to be brazed, or joint areas, because the coating in such areas will interfere with the integrity of the braze. The next step is to stack a plurality of flat thin metal strips and corrugated thin metal strips in the manner shown in FIG. 2. If the center sections of the corrugated thin metal strips are not already flattened, the stack may be crushed between suitable jaws to flatten the center portion. The central portions of the layers forming the stack may be brazed, using for example, a brazing paste, or by welding. This provides a rigid center post which facilitates S-winding the stack, and prevents axial movement of the layers in this region.

The next principal step is S-winding the stack by grasping the rigid center post and rotating the center post in a clockwise or counterclockwise direction whereby an S-wound honeycomb body is formed. A temporary binder tape or band may be used to hold the S-wound body to prevent unwinding.

The next step is to wrap the S-wound honeycomb body with a thin (0.001" to 0.002" thick) brazing foil which is commercially available and which fuses at about 2150 degrees F. Thereafter, the wrapped honeycomb body is inserted into a tubular jacket or housing and allowed to expand against the inner walls of the housing. This brings the cleaned, or coating free distal ends of the thin metal layers very close to the inner surface of the housing being separated therefrom by the interposed very thin brazing metal foil.

Now the device is ready for induction heating to fuse the brazing foil and secure the distal ends of the thin metal strips to the inner surface of the housing. To the accomplishment of this operation, the honeycomb body is placed within the coil of an induction heater. The latter is desirably a hollow, water cooled copper coil slightly larger, e.g., 1/16" to 1/4", in diameter than the honeycomb body. The copper coil is located within a sealable chamber. Argon gas may be used to purge the chamber of air, and the pressure within the chamber may be near complete vacuum. The argon gas is pumped down to a desired pressure with a vacuum pump.

The temperature of the outer layer of the honeycomb body, sensed by an infra red sensor, is ramped up, or elevated, to about 1900 degrees F. over a predetermined time, e.g., about 40 seconds and held at this temperature for about 15 seconds, and then over an additional 15 second period, the temperature is raised to the fusion temperature of the brazing foil. Upon reaching the fusion temperature, the power is immediately cut off and the finished honeycomb body removed from the chamber and allowed to cool to room temperature.

Figure 2:
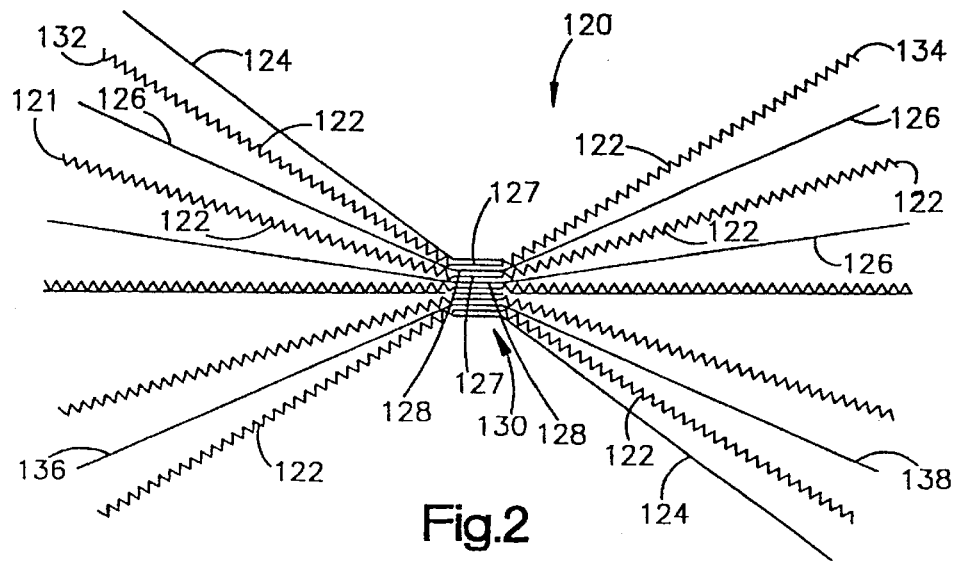
FIG. 2 is an end view of a stack of thin metal sheets which has been crushed in the center portion and prior to spirally winding or S-winding to form a honeycomb body for insertion into a tubular jacket or housing

FIG. 2 shows in end view a stack generally indicated at 120 and composed of alternating corrugated thin metal strips 122 and flat thin metal strips 124 with a reinforcing web 123 centrally located therein to strengthen the honeycomb body. Reference may be had to copending commonly owned U.S. patent application Ser. No. 08/370,643 filed 10 Jan. 1995 by David Thomas Sheller and entitled "Reinforcing Web for Multicellular Converter" the disclosure of which is incorporated herein by reference, for details of construction of a honeycomb body useful herein. It should be noted that the flat strips 124 at the top and bottom of the stack are half length flat strips 124 and are used for the purpose of preventing nesting of the left end of the upper corrugated strip 122, and preventing nesting of the right end of the lower corrugated strip 122 when those penultimate corrugated strips are brought into contact with each other by spirally winding the stack. The individual strips 122, 124, and 126 must be of a high temperature resistive, oxidation resistant alloy, such as those mentioned above. The corrugated thin metal strips 122 each have a flattened central portion 127, and each of the flat thin metal strips 126 and 124 have a flat central portion 128 or, for the half length flat strips, a flat end portion 128 which is located at the center of the stack 120. The group or stack 120 is gathered at the flat central portions 127 and 128 and connected together by mechanical means, e.g., stapling or riveting, or by means of a bifurcated pin, or by a fused metal as by brazing or welding. The flat central portions 127 and 128 of the layered strips 122, 124 and 126 are desirably about 3/16 to about 1" wide as shown in FIG. 2. A suitable brazing paste is desirably applied in this area, after cleaning to remove any coating, to enable bonding of the layers together to form a rigid central member 130 about which the multicellular honeycomb converter core body may be spirally wound, or S-wound. The layers 122, 124 and 126 are desirably crushed together with a suitable die under a heavy load (one to five tons per square inch). Heat may be applied to braze or weld all the layers together in the central area 130. This unifies the stack 120 in the center without the necessity for using a pin or rod. For purposes of this invention, the corrugated thin metal sheets and the flat thin metal sheets are pre-treated by a process such as shown in Cornelison et al U.S. Pat. No. 4,711,009, supra, for applying a coating of refractory metal oxide and noble metal catalyst. The refractory metal oxide is desirably applied as a washcoat and is conveniently a 75% gamma-alumina, 25% ceria mixture in an aqueous medium. There may be 6 to 12 or more such layers 122, and 126 with end flat layers 124 at each end of the stack 120. The coating must be removed in the central portions 127 and 128 by grit blasting or rotary wire brushing. The coating should also be removed at the distal ends of the thin metal sheets or strips 122, 124 and 126 for about 1/8" to about 1/3" to define a joint area and to enable brazing of the thin metal strips to the housing, e.g., housing 22 in FIG. 3. As shown in FIG. 2, the individual thin metal strips 122 and 126 are continuous through the respective central portions 127 and 128, respectively, from one free end 132, or distal end 132, to the free end 134, or distal end 134, of the corrugated thin metal strips 122; and continuous from one free end 136, or distal end 136, to the other free end 138, or distal end 138 of the flat thin metal strips 126. The strips are generally from about 4 inches to about 24 inches long and from about 1 inch to about 8 inches wide.

Instead of fully coating the thin metal strips or layers and cleaning the joint areas of coating and catalyst, the central portions and/or the distal ends thereof may be masked to prevent application of coating in the joint areas.

The group of layered thin metal strips of FIG. 2 is shown in expanded, uncoiled relation. The stack of FIG. 2 is gripped in the central portion with suitable legs or jaws, such as the legs of a bifurcated pin (not shown) and rotated in a clockwise manner, for example, until the thin metal strips are tightly wound in a spiraliform manner, or S-wound, whereby the thin metal strips 122 and 126, with half strips 124 on the outside of the stack 120, are brought into contiguous relation along their entire lengths. After winding, wrapping with brazing foil and insertion in the tubular housing 22 (FIG. 3) the legs or jaws (or bifurcated pin) are removed. If the strips 122 and 126 are of equal length, the resulting configuration will be circular. If the strips 122 and 126 are of different lengths, or the flattened portions displaced from the center of the strip length, then any oval or elliptical shape may be achieved as will be understood by those skilled in the art.

Figure 3:
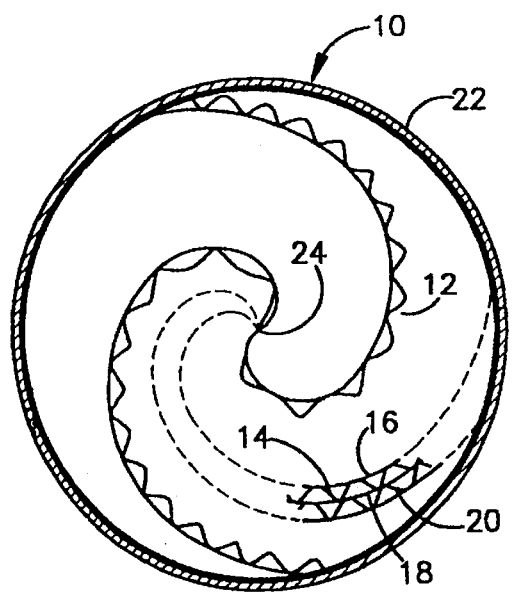
FIG. 3 is an end view of a converter body in accordance herewith showing the S-Wound honeycomb core retained within a housing and a brazing metal foil in place between the housing and the honeycomb core prior to heating to fusion temperature.

Referring to FIG. 3, there is here shown a multicellular honeycomb converter body 10 having an S-wound reinforcing web 12 along with a plurality of corrugated thin metal strips 14 and 20, and flat thin metal strips 16 and 18 which form the multicellular honeycomb body 10. The S-wound strips, e.g., 14, 16, 18, and 20, are tightly wound and retained within a retaining housing 22 or mantle 22, which is desirably a tubular stainless steel member. Also shown in FIG. 3 is a brazing metal foil layer 21, prior to fusion and disposed between the distal ends of the thin metal strips and the housing 22. As shown in FIGS. 2 and 3, the central portion 24 of the reinforcing web 12 is flattened.

Figure 4:
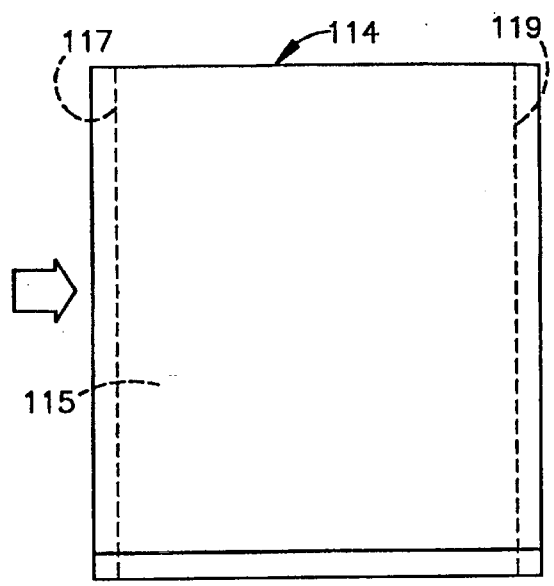
FIG. 4 is a side view of a converter body in accordance herewith showing the direction of gas flow through the converter body.

FIG. 4 is a side elevation of a core body 114 showing the direction of gas, or fluid, flow from the inlet, or upstream end 117 to the outlet, or downstream end 119 of the honeycomb core 115.

FIG. 5 shows a preferred temperature/time profile useful in the present invention. When the induction coil is energized under a suitable power control, the temperature is raised, or ramped up, over a period of about 40 seconds to a level of about 1900 degrees F. where it is held for about 15 seconds to allow the distal ends of the thin metal strips or layers and the brazing foil to grow to meet the mating inner surface of the housing. Then the temperature is raised, or ramped up, over a 15 second period to 2150 degrees F. which is sufficient to fuse the brazing foil and join the parts together. The power is immediately cut off at this point and the device allowed to cool. Because only the outermost portion of the honeycomb body is heated, the catalyst and the coating supporting it are not deleteriously affected by the brazing process.

What is claimed is:

1. A process for adhering an at least partially coated and catalyzed first metal body to a second betal body which comprises the steps of (a) providing at least one first metal body having a coating of refractory metal oxide and a catalyst supported thereon and having at least one uncoated joint area to be adhered to said second metal; (b) applying a fusible brazing metal to said joint area to be adhered to said second metal, said brazing metal having a predetermined fusion temperature; (c) retaining said first and second metal bodies against relative movement to provide an assembly; (d) placing said assembly within the coils of an induction heater; (e) applying electrical power to said induction heater to raise the temperature in said joint area to an intermediate temperature below said predetermined fusion temperature and holding for a period of about 15 seconds and thereafter raising the temperature to said predetermined fusion temperature to fuse said brazing metal; (f) upon reaching the predetermined fusion temperature immediately terminating the application of power; and (g) cooling said assembly to effect adhesion of said first metal body to said second metal body.

2. A process as defined in claim 1 further including the step of removing said coating and catalyst on said first metal body from the joint area to be adhered to said second metal body.

3. A process as defined in claim 1 wherein the refractory metal oxide comprises alumina.

4. A process as defined in claim 1 wherein the refractory metal oxide is a mixture of alumina and ceria.

5. A process as defined in claim 1 wherein the refractory metal oxide is a 75% alumina 25% ceria mixture.

6. A process as defined in claim 1 wherein the refractory metal oxide comprises titania.

7. A process as defined in claim 1 wherein the catalyst is a noble metal catalyst.

8. A process as defined in claim 7 wherein the noble metal catalyst is selected from the group consisting of platinum, palladian, rhodium, indium, ruthenium, and mixtures of two or more of such metals.

9. A process as defined in claim 1 wherein said first metal body comprises a corrugated thin metal strip.

10. A process as defined in claim 1 wherein said first metal body comprises a plurality of corrugated thin metal strips alternately layered with flat thin metal strips and S-wound to form a multicellular honeycomb body.

11. A process as defined in claim 10 wherein the corrugated thin metal strips and the flat thin metal strips have distal ends, said distal ends having the coating and catalyst removed therefrom to define a joint area.

12. A process as defined in claim 1 wherein the second metal body is a tubular metal housing which retains said first and second metal bodies against relative movement.

13. A process as defined in claim 1 wherein said induction heater is contained within a sealable chamber.

14. A process as defined in claim 12 further including the steps of sealing said changer, and replacing the gas in said sealable chamber with an inert gas.

15. A process as defined in claim 14 further including the steps of sealing said chamber and creating a vacuum in said sealable chamber.

16. A process as defined in claim 14 wherein the inert gas is argon.

17. A process as defined in claim 1 wherein the brazing metal is a brazing metal paste.

18. A process as defined in claim 1 wherein the first and second metal parts are stainless steel.

19. A process as defined in claim 18 wherein the stainless steel is a ferritic stainless steel.

20. A process as defined in claim 18 wherein the stainless steel comprises nickel and chromium.

* * * * *